(12) United States Patent
Lahiri

(10) Patent No.: US 7,573,386 B2
(45) Date of Patent: Aug. 11, 2009

(54) SYSTEM AND METHOD FOR SMART RADIO FREQUENCY IDENTIFICATION TAGS

(75) Inventor: Sandip Lahiri, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 10/922,248

(22) Filed: Aug. 19, 2004

(65) Prior Publication Data

US 2006/0038684 A1 Feb. 23, 2006

(51) Int. Cl.
*G08B 13/14* (2006.01)

(52) U.S. Cl. ............... 340/572.1; 340/568.1; 340/10.1

(58) Field of Classification Search ... 340/572.1–572.9, 340/540, 571, 568.1, 825, 10.1, 10.3, 10.34; 705/28

See application file for complete search history.

(56) References Cited

U.S. PATENT DOCUMENTS

| | | | |
|---|---|---|---|
| 6,496,806 B1 | 12/2002 | Horwitz et al. | 705/28 |
| 6,600,418 B2 | 7/2003 | Francis et al. | 340/572.1 |
| 6,601,764 B1 | 8/2003 | Goodwin, III | 235/385 |
| 6,669,089 B2 | 12/2003 | Cybuski et al. | 235/385 |
| 6,707,381 B1 * | 3/2004 | Maloney | 340/568.1 |
| 6,712,276 B1 * | 3/2004 | Abali et al. | 235/492 |
| 6,720,866 B1 * | 4/2004 | Sorrells et al. | 340/10.4 |
| 6,919,803 B2 * | 7/2005 | Breed | 340/539.14 |
| 2002/0067265 A1 * | 6/2002 | Rudolph | |
| 2002/0089434 A1 | 7/2002 | Ghazarian | 340/988 |
| 2005/0242957 A1 * | 11/2005 | Lindsay et al. | |

\* cited by examiner

*Primary Examiner*—Benjamin C Lee
*Assistant Examiner*—Daniel Previl
(74) *Attorney, Agent, or Firm*—David A. Mims, Jr.; Darcell Walker

(57) ABSTRACT

The present invention is a method system that detects the altering of the contents of a package. This system comprises a Radio Frequency Identification (RFID) tag that is affixed to a package. This RFID can receive, store and transmit information received related to the package contents. A pressure sensitive material is positioned in the package such that this material can sense the weight of the package contents. When the weight of the package contents changes, the RFID tag will receive a signal directly or indirectly from the pressure sensitive material. This weight change is recorded in the RFID. When a RFID reader energizes the RFID, this current package weight is transmitted to the RFID tag reader. The RFID tag reader can then determine if the weight transmitted by the RFID tag is the original package weight or a new package weight. A new package weight would indicate some altering of the original package contents.

7 Claims, 5 Drawing Sheets

SYSTEM AND METHOD FOR SMART RADIO FREQUENCY IDENTIFICATION TAGS

FIELD OF THE INVENTION

The present relates to a method, system and device for tracking merchandise during the shipping process and in particular to a method, system and device for tracking packaged merchandise and detecting and determining whether there has been tampering with the merchandise and the packaged has been sealed.

BACKGROUND OF THE INVENTION

To achieve highly efficient warehouse operations, it is desirable to accurately track the movements of pallet loads and other objects to be located and/or transferred within the warehouse as they are transported to and from various locations, such as storage locations, stocking locations, staging areas and loading docks. In typical conventional warehouse management operations, the operator of a transport vehicle, such as a fork truck, reach truck, lift truck or pallet truck, receives a set of printed stocking or picking orders, typically generated by a computer, and executes the orders by visually identifying the loads and locations and transporting the loads to and from the locations specified on the orders. In such a system, especially in large-scale warehouses with a large number of locations and loads to handle, there are numerous opportunities for errors.

Radio-frequency identification ("RFID") tag systems have been proposed for use in inventory tracking. In such a system, an RFID tag is attached to an object or location, and contains a non-volatile memory for storing information identifying the object or location and electronic circuitry for interacting with an interrogator. RFID tags may be passive or active. In the case of a passive RFID tag, the tag includes circuitry for converting at least a portion of the received RF signals into electrical power needed by the tag for signal processing and transmission. In a typical conventional system, RFID tags containing information associated with the identities of inventory items to be tracked are attached to the inventory items. An RFID interrogator is used to detect the presence of an RFID tag and read the identification information from the tag. A typical RFID interrogator includes an RF transceiver for transmitting interrogation signals to and receiving response signals from RFID tags, one or more antennae connected to the transceiver, and associated decoders and encoders for reading and writing the encoded information in the received and transmitted RF signals, respectively. The interrogator may be a portable device, which can be brought near the tags to be read, or it may be a stationary device, which reads the tags as they are brought to the interrogator, as in the case of tagged library books being returned to a return station that is fitted with an interrogator. RFID tags may also be affixed near a location as a location marker. After detecting both a tag attached to an inventory item and a location marking tag, a processing unit associated with the interrogator may determine that the inventory item is positioned near the tagged location. While these conventional object tracking systems are capable of keeping a record of the inventory items and sometimes their locations, they are not effective for tracking and/or managing the movement of the inventory items.

There also exist warehouse inventory tracking systems that include fixed RFID interrogators at various locations to detect RFID-tagged items when they are positioned near the interrogator-equipped locations. For example, there are warehouses with RFID interrogators positioned at or near the loading dock gates. Such systems are capable of tracking the arrival of tagged items at the various locations, but are not capable of detecting errors remote to these locations. For example, if a fork truck picked up a wrong load because the truck was driven to a wrong pick-up location, the error would not be detected until the load had reached the gate. This delayed error detection negatively impacts the overall efficiency of warehouse operations. Additionally, outfitting each of the numerous loading dock gates with an interrogator is not cost effective.

Radio Frequency Identification (RFID) is a technology that uses hardware devices, called transponders or tags, to store data. The data on such a tag can be read and written by RFID Readers in a contact-less manner using radio waves. The RFID technology has attracted a very high-level of interest in the industry. This is especially true in the Consumer Packaged Goods (CPG) and Retail Industries where the benefit of using RFID is readily apparent. But as with any new technology, the standards are not defined and even when these are defined components several aspects of the solution are either unspecified or is a part of the future roadmap. However, the RFID technology is still being matured to provide solutions to business problems. A very common open problem is tagging real-world objects with RFIS tag so that RFIS readers can successfully read them. Because of virtually infinite combinations of material, packaging, orientation and other factors tagging a simple real-world object can be difficult if not impossible.

A very common need of the business community is to tag items that are in a pallet. Now these items could be individual items like cans of paint or acid or boxes of cans. Radio waves perform extremely poorly if placed on metal and liquid items. Also, even if tags are placed on containers made of metal or containing liquid then all of these containers cannot be read by RFIS readers as there is a limitation as to how much the radio waves can penetrate inside a pallet that contains several containers. Also, another problem in the business community is shrinkage, which refers to stolen or lost items during production. Thus, for example, a case containing 5 large cans of soup is tagged using an RFID tag, and someone takes one of the soup cans out of the case. There is no way of knowing that by just reading the tag data. Thus, the problem is two-fold:

(1) How to read a large number of items on a pallet successfully if the items are made of non-friendly material?

(2) How to dynamically determine if some of the items have been stolen from the pallet?

There remains a need for a radio frequency identification tag that can be used on non-friendly materials and can detect when there is a change in the number of items in a sealed package.

SUMMARY OF THE INVENTION

It is an objective of the present invention to provide a method and system that can detect the altering of number of items in a package.

It is a second objective of the present invention to provide a pressure sensitive material that serves as a sensor to detect when there is change in the weight of a package.

It is a third objective of the present invention to provide a logic component on the pressure sensitive material that will be able to transmit information when there is a detection of a change in the weight of the package.

It is a fourth objective of the present invention to provide a modified radio frequency identification tag having a component that interfaces with the pressure sensitive material.

The present comprises a system in which sensors transmit information to radio frequency identification tags (RFID). The RFIS can then relay store or relay this information to other data processing equipment or to personnel. The information will indicate whether there has been a change in the initial content of a sealed package.

An RFID tag is mainly composed of two things: 1) a small computer chip and an antenna that supplies power to the chip when energized by a suitable RFID reader. The chip performs application specific logic and has data storage capacity. The identity of an item is stored in the data storage areas as a unique identifier. However, this is static information and cannot change unless specifically overwritten by a suitable RFID reader. The RFID tag described in the present invention has a very simple and inexpensive component attached to the computer chip that provides the chip with real-time information about the tagged item. In addition, this chip needs no power to operate. Based on the information available from this component a chip can deduce some basic information about the item on which it is placed. The tag then transmits this (possibly modified) information to the backend systems via a suitable RFID reader. The backend system, from this (possibly modified) information can determine if shrinkage has occurred. Also, for a large number of items placed inside a case only one tag is required to tag all the items as opposed to one tag per item in the case to determine the contents inside this case.

The present invention also comprises a piezoelectric material that generates electric voltage when subject to mechanical stress like pressure. Material like piezoelectric ceramics based on modified Lead Zirconate Titanates are commercially available for this purpose. The piezoelectric property of a material in response to pressure for example is nearly linear. Thus, this means that when the pressure increases the resulting voltage generated from the material also increases and vice versa. This principle can be used to design smart RFID tags in the manner described below.

The piezoelectric material in form of a thin sheet and possibly embedded in protective material like a plastic film, acts as a "sensor" S of the weight of an object or package. This weight sensor S can be placed at the bottom of the package enabling the piezoelectric material to be subject to mechanical stress of the package weight. This mechanical stress will result in an electric current that will be proportional to the intensity of the mechanical stress on the material. In addition, there will be another logic device D on S, which will interface with the electric current, generated from the material and output a number N that will represent the amount of electric current generated. Since this current is proportional to the mechanical stress that associated weight of the object that generated this current can be measured by multiplying the output number N by a suitable constant. This can be determined experimentally for a particular piezoelectric material type and its physical dimensions used for constructing the sensor. The device D will be connected directly with the smart RFID tag's chip C. It may also be embedded in the ship itself. The chip, when energized in the presence of an appropriate reader, will transmit either the value of N or a properly transformed value of N, which denotes the weight of the object. If N is transmitted to the reader, the reader can then apply the appropriate translation of N to determine the weight of the object by multiplying N with a suitable constant. Thus, the transformation of N to the weight of the object can happen at the chip level, at the reader level or even at the application programming level.

DETAILED DESCRIPTION OF THE INVENTION

Figure 1:
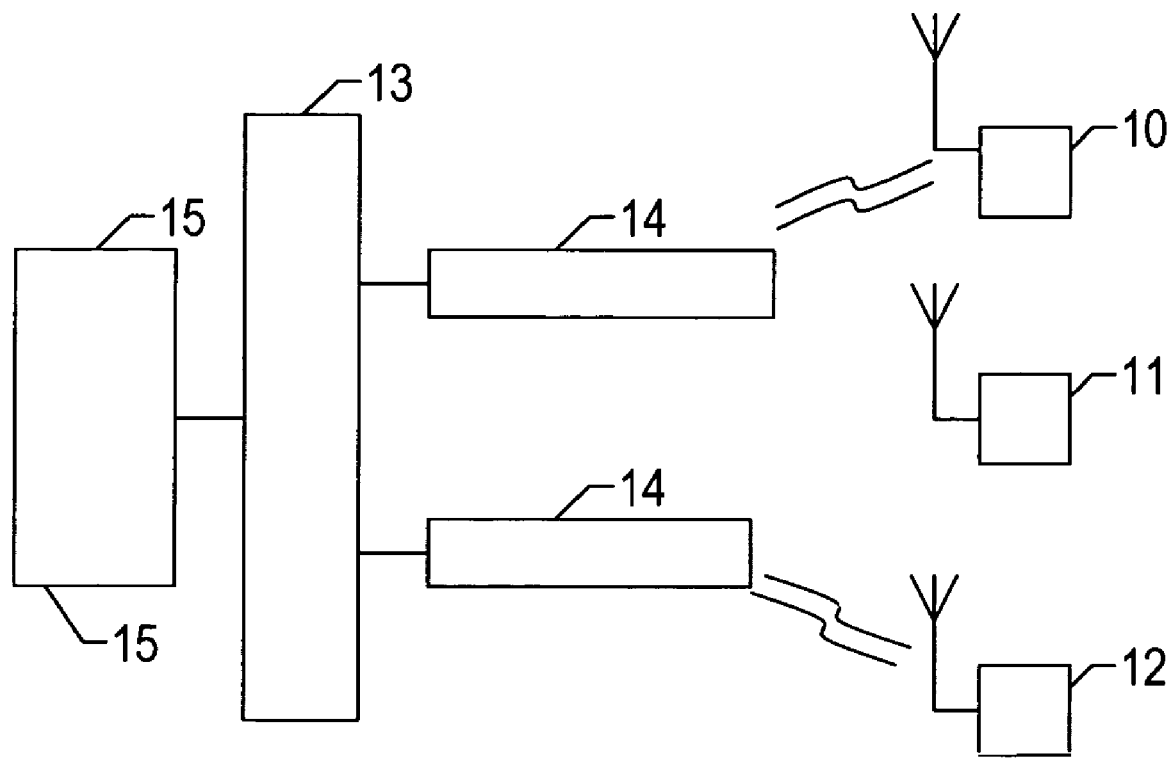
FIG. 1 is a configuration of the conventional RFID communication system.

Referring now to FIG. 1, there is shown an overall block diagram of the operation of a conventional radio frequency identification system. Tags 10, 11, and 12 detect and store information. The interrogator 14 can query the tags for this information. Once the interrogator device has the tag information, this interrogator device communicates with an application processor 13 over a local area network (LAN) 15.

One class of RFID applications involves using RFID technology to read information from a tag affixed to a container or pallet. In this application, the container is moved across the reading field of an interrogator. The reader field is that volume of space wherein successful communications between the tag and the interrogator can occur. While the tag is in the reading field, the interrogator and tag must complete their information exchange before the tag moves out of the interrogation field. Since the tag usually moves quickly through the reading field, the RFID system may have only a limited amount of time to successfully complete the transaction. In accordance with the invention, a communication protocol advantageously controls communication between the interrogator and one or more tags for effectively reading of these tags. In some systems, both the tags and interrogator have the ability to send and receive information.

The communication protocol is configurable in two modes in which a read/write tag can be expected to operate. In the first mode, a rapid transfer of a limited amount of data takes place between the interrogator and one or more tags. In the second mode, a slower or less time critical transfer of a large quantity of data in a packet format takes place.

Figure 2:
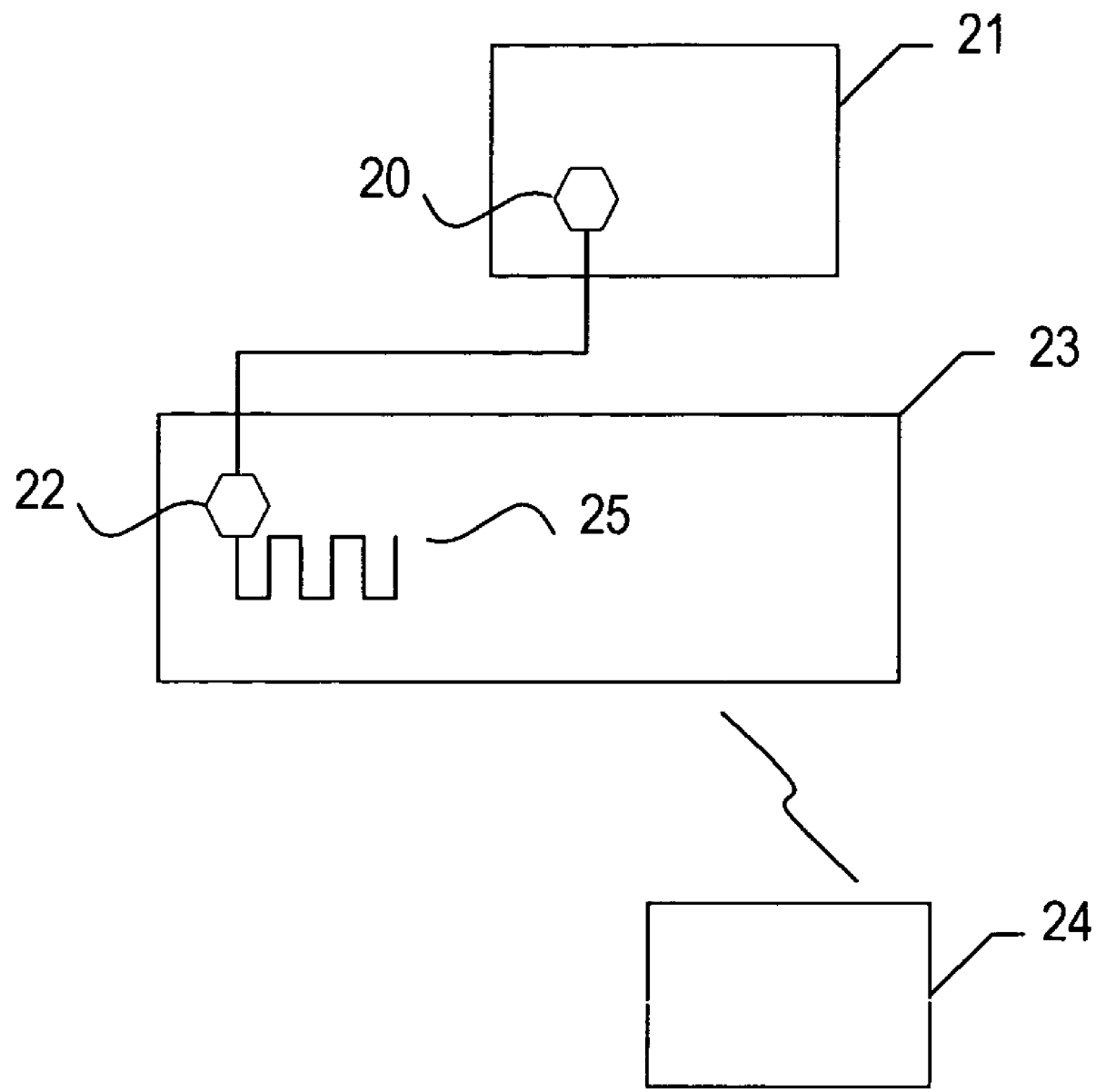
FIG. 2 is a configuration of the RFID communication system of the present invention.

Referring now to FIG. 2, shown is an overall block diagram of the operation of a radio frequency identification system in accordance with the present invention. This system comprises a sensor 20 that has the ability to interface with the electric current generated from the piezoelectric cover material 21 (see FIG. 3). This sensor 20 will also communicate with chip 22 in the RFID tag 23. The sensor 20 will convey pressure readings to the chip 22. The interrogator/RFID tag reader 24 has the ability to communicate with the RFID tag. This communication can occur via an antenna device 25 on the RFID chip 22. As mentioned, the interrogator can send a signal to energize the chip 22 in the RFID tag 23. When the chip is energized it will transmit the pressure reading to the interrogator.

The RFID chip can have the capability to determine pressure differences based on the readings received from the sensor 20. The technique to make these determinations can be a simple comparison program, which compares a present pressure value to a newly received pressure value. In addition, the sensor 20 could periodically transmit pressure readings to the chip 22. The sensor could also transmit pressure readings when there is a change in the pressure exerted on the piezoelectric material that results from the weight of the packaged contents. In the alternative, the interrogator device 24 can make the calculations that determine whether there is pressure change in the packaged material.

Figure 3:
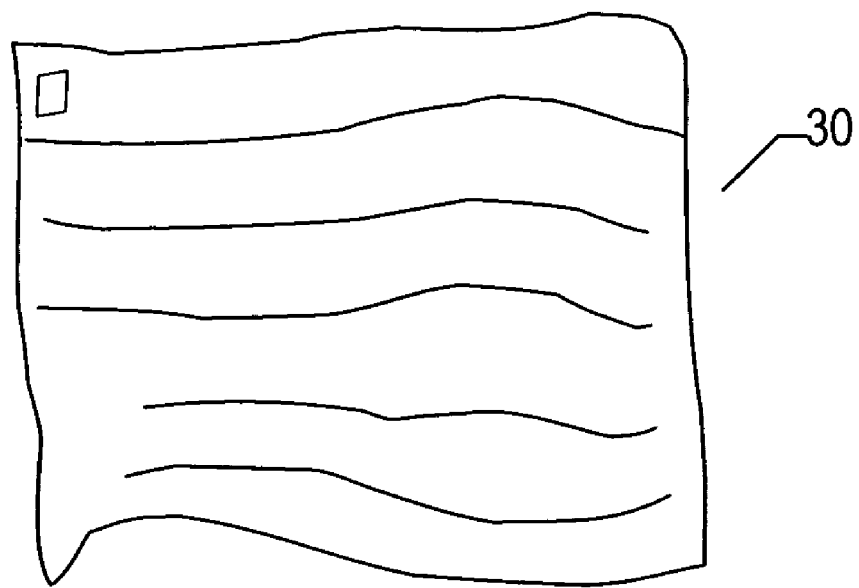
FIG. 3 is an illustration of pressure sensitive cover that can sense the weight of packages for use in the present invention.
Figure 4:
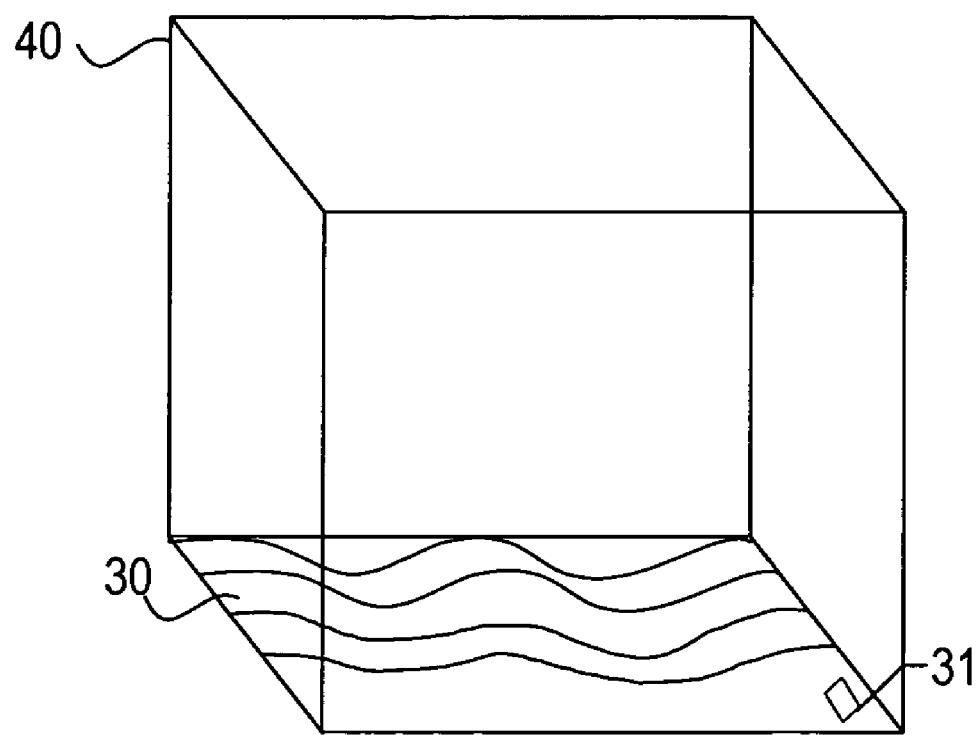
FIG. 4 is an illustration of a package containing the pressure sensitive cover for use in the RFID communication system of the present invention.

FIG. 3 is an illustration of pressure sensitive cover 30 that can sense the weight of packages for use in the present invention. As previously mentioned, this cover can comprise a piezoelectric material in the form of a thin sheet that can be embedded in a plastic in which products are wrapped. This weight sensitive can be placed in the bottom of a package container. FIG. 4 shows a package container 40 with the pressure sensitive material 30 positioned in the bottom of the container. The pressure sensitive material will product an electric current when the material is subjected to mechanical stress. Such mechanical stress can result from increased pressure resulting from the weight of products placed on this material. The electric current produced by the mechanical stress will be proportional to the intensity of the mechanical stress on the material. A logic device 31 placed on or connected to the piezoelectric material will interface with the electric current generated from the material and will output a number N that will represent the amount of electric current generated. Since this current is proportional to the mechanical stress that associated weight of the object that generated this current can be measured by multiplying the output number N by a suitable constant. This constant can be determined experimentally for a particular piezoelectric material type and its physical dimensions used for constructing the sensor. The logic device 31 will be connected directly with the smart RFID tag's chip 22. It may also be embedded in the ship itself. Referring to FIG. 4, an RFID tag 23 could be attached to the container 40.

In an example of the use of the pressure sensitive material, a container, such as a pallet, of weight W has a smart tag attached to it. The tag transmits the weight either indirectly (using N) or directly (by actually performing the transformation of N to W at the tag level) to an appropriate reader. Next, assume that this pallet is made of four cases variable of objects each weighing W1, W2, W3 and W4 respectively so that, $$W=W1+W2+W3+W4$$

If now a case having a weight corresponding to W3 is removed from the container, then the weight of the container transmitted (direct or indirect) to the reader will be W1+W2+W4 which is less than W. Using this value, an application programmer can determine that the shrinkage has taken place for this pallet. As a result, information can be used in the process of controlling product inventories or other similar application. In addition, this method can be used in security operations.

Figure 5:
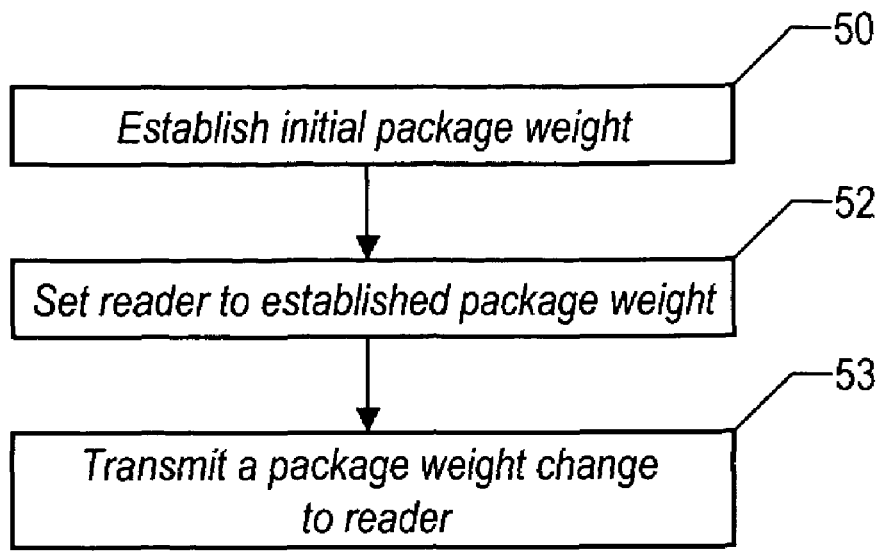
FIG. 5 is a flow diagram of the basic steps in the implementation of the present invention.

Referring to FIG. 5, shown is a flow diagram of the basic operations in the RFID system of the present invention. In a system as described in FIGS. 2, 3, and 4, the initial step 50 is to establish a reference weight of the package container. This step can involve initially placing the product material in the package and determining an initial reading from the pressure sensitive material 30 and logic device 31. This initial reading will serve as the reference weight. This reference weight will be proportional to the current generated from the pressure sensitive material. After the establishment of the reference weight in step 50, step 51 sets the tag reader 24 to the reference weight of the package established in step 50. At this point, the next step 52 will be to transmit the package weight when the tag reader is present. During the time after the establishment of the reference weight, there can be periodic transmissions to the RFID tag of the current weight of the package. If the weight remains constant, there will be not change in the readings at the sensor 30 and logic device 31 or at the RFID tag 22. As a result, when the tag reader is present and energizes the RFID tag 22, the weight read from the tag will be the same as the reference weight. However, if there has been some tampering with the package and the weight has changed, a new weight will show when the tag reader energizes the RFID tag.

Figure 6:
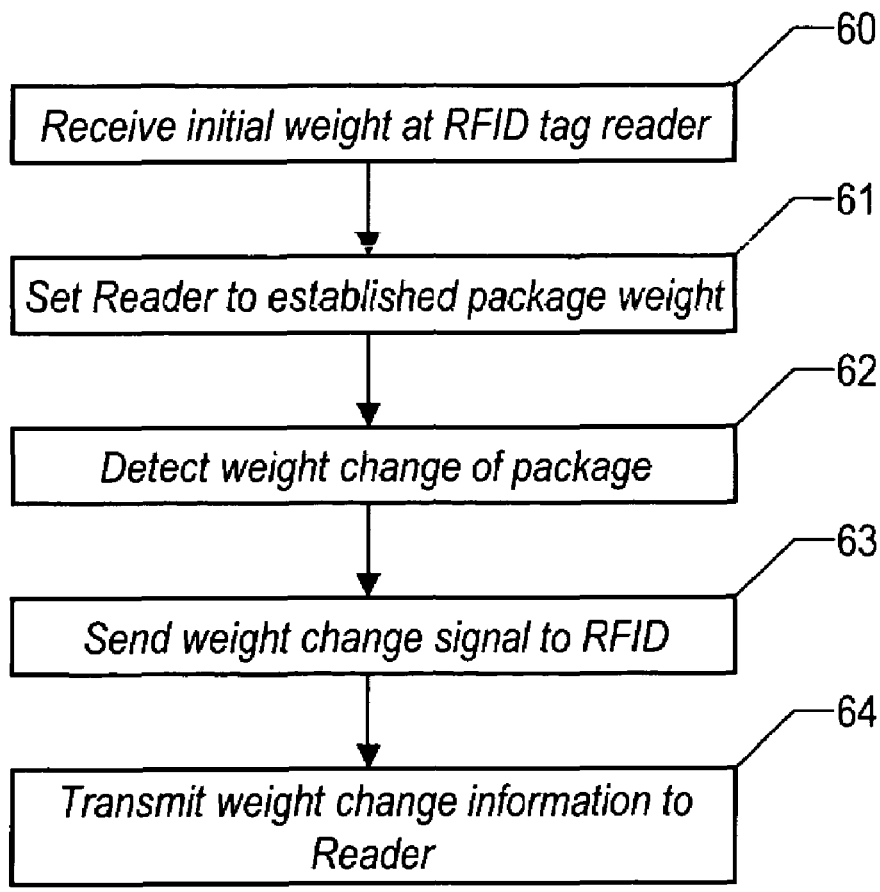
FIG. 6 is a flow diagram of the steps in the implementation of a primary embodiment of the present.

FIG. 6 is a flow diagram of the steps in the implementation of a primary embodiment of the present invention. In step 60, the RFID tag reader receives an initial package weight reading. The RFID tag reader sets its reference weight value to that received weight in step 61. A weight change is detected at the pressure sensor and a signal corresponding to the new detected weight value is sent to the RFID tag from the sensor on the pressure sensitive material in step 62. The RFID tag stores this value in step 63. The RFID tag can have the ability to calculate a new weight value and transmit that value to the tag. In step 64, this stored value is transmitted to the RFID tag reader in step 63. The conversion to the new weight can take place in the RFID tag or the tag reader.

Figure 7:
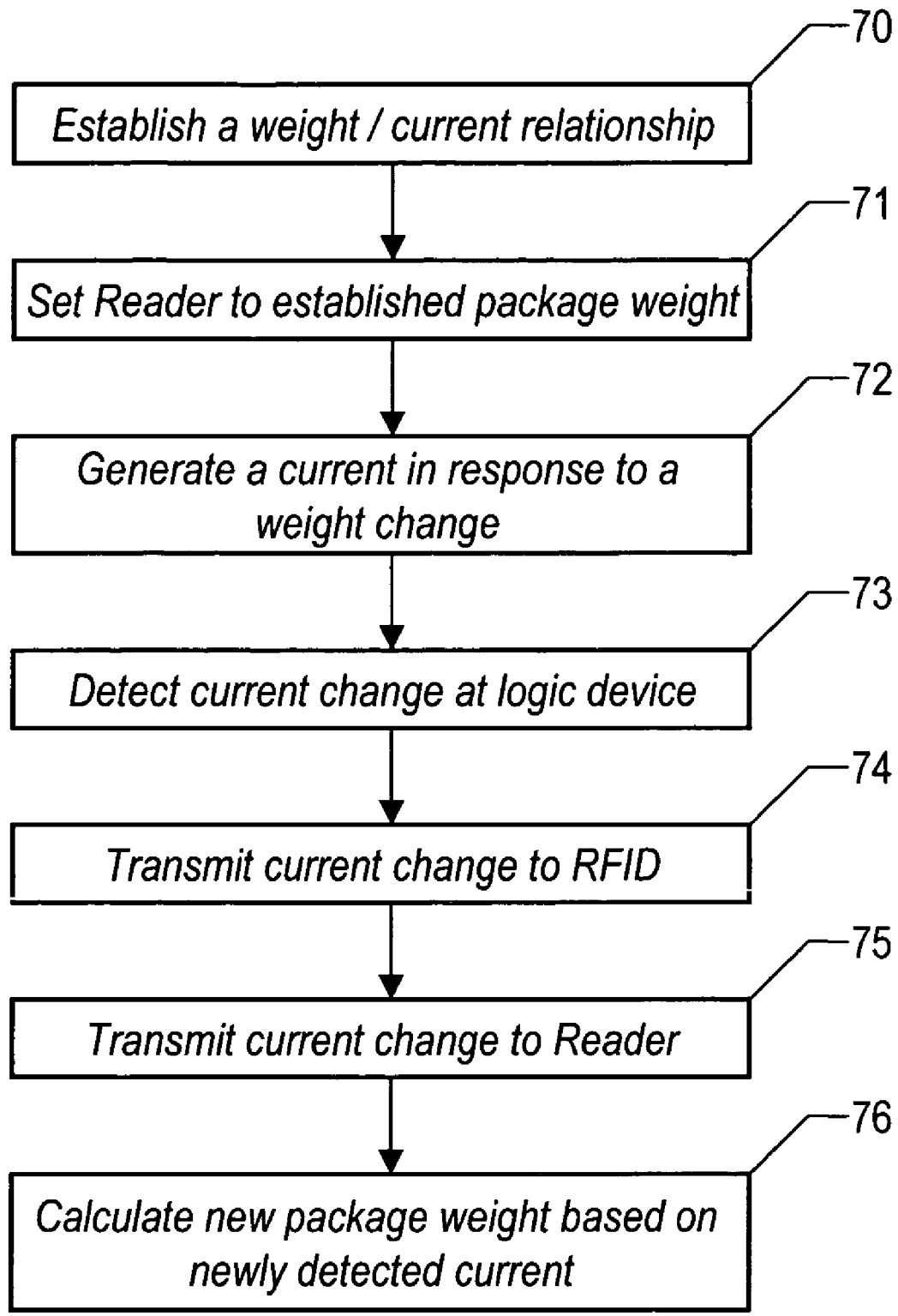
FIG. 7 is a flow diagram of the steps in the implementation of an alternate embodiment of the present invention.

FIG. 7 is a flow diagram of the steps in the implementation of an alternate embodiment of the present invention. In this method, step 70 establishes a relationship between the current emitted by the pressure sensitive material and the weight of the package material. Step 71 establishes the initial weight of the package contents and set the RFID tag reader to this reference weight value. Step 72 will generate a current in the pressure sensitive material in response to a change in the pressure caused by the package contents. This change in pressure indicates a change in the weight of the package contents. A logic device incorporated into the pressure sensitive material measures this current that is generated in response to change in pressure of the material. As part of step 73, this logic device also produces a number that represents the amount of generated current. Step 74 transmits this current number from the logic to the RFID tag. The RFID tag will store this information. In step 75, the RFID tag reader energizes the RFID tag. At this point, the RFID tag transmits the stored current number to the RFID tag reader. In step 76, the RFID tag reader calculates the package weight. This calculation is based on the initial relationship established in step 70 between weight and current. Any change in the package weight would indicate whether there has been any altering of the package contents.

Alternate implementations of the method of the present invention could have automatic and periodic submission of the presently existing current from the logic device to the RFID tag, instead of only when there is a change in the current. Another alternative could be for the RFID tag to calculate the package weight based on the current number instead of the calculations occurring at the RFID tag reader.

Note that the techniques of the present invention are independent of the material type of the object. Hence, this scheme will work for all material types both RF-friendly and RF-unfriendly assuming that the smart tag has been mounted suitably so that it can transmit its data to a reader.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

Having thus described the invention, what we claim as new and desire to secure by Letters Patent is set forth in the following claims.

I claim:

1. A method for implementing smart radio frequency identification (RFID) tags to detect an alteration of package contents comprising the steps of:
   establishing an initial package weight by establishing a relationship between package weight and a pressure on a package resulting from package content weight;
   recording this initial package weight at a RFID tag as a generated number;
   detecting a change in the weight of the package contents from automatic and periodic submissions of presently existing current measurements submitted from a logic device capable of measuring electrical current to the RFID tag and generating a signal when a change in the pressure on the package resulting from the weight of the package contents is detected;
   recording the change in the package weight at an RFID tag; and
   transmitting the change in package weight to the RFID tag reader, by energizing the RFID tag and receiving the generated number recorded in the RFID tag.

2. The method as described in claim 1 wherein said recording change in the package weight at an RFID tag step further comprises the steps of: generating a change number from the generated signal represents the change in pressure; receiving at the RFID tag the generated change number; and storing the generated change number at the RFID tag.

3. The method as described in claim 2 further comprising after said receiving the generated number stored in the RFID tag step, the step of calculating a current package weight using the generated number and relationship between pressure and weight.

4. The method as described in claim 3 further comprising the step of storing this calculated package weight in the RFID tag such that this particular package weight is identified with the particular package.

5. A method for implementing smart radio frequency identification (RFID) tags to detect an alteration of package contents comprising the steps of:
   receiving an initial package weight at an RFID tag;
   recording this initial package weight at the RFID tag;
   establishing a relationship between package weight and a pressure on a package resulting from package content weight;
   detecting a change in pressure generated by the weight of the package content from automatic and periodic submissions of presently existing current measurements submitted from a logic device capable of measuring electrical current to the RFID tag and generating a signal when a change in the pressure on the package resulting from the weight of the package contents is detected;
   receiving the change in the package weight at said RFID tag; and
   transmitting the change in package weight to an RFID tag reader.

6. The method as described in claim 5 wherein said receiving the change in the package weight at an RFID tag step further comprises the steps of: generating a number from the generated signal represents the change in pressure; receiving at the RFID tag the generated number; and storing the generated number at the RFID tag.

7. The method as described in claim 6 further comprising before said transmitting step, the step of calculating a current package weight using the generated number and relationship between pressure and weight.

* * * * *